United States Patent [19]

Greenlaw et al.

[11] Patent Number: 4,603,944

[45] Date of Patent: Aug. 5, 1986

[54] OPTICAL DEVICE FOR AN INDIVIDUAL

[75] Inventors: John W. Greenlaw, Walnut Creek; Gary R. Schlueter, Castro Valley; Karsten Kettlitz, San Leandro, all of Calif.

[73] Assignees: Karsten Kettlitz, San Leandro; Gary Schlueter, Castro Valley, both of Calif.

[21] Appl. No.: 644,529

[22] Filed: Aug. 27, 1984

[51] Int. Cl.⁴ .......................... G02B 7/02; G02B 7/18
[52] U.S. Cl. ................................ 350/252; 350/638; 351/50
[58] Field of Search .................. 248/480, 481, 484; 350/248, 631, 638; 351/50, 52

[56] References Cited

U.S. PATENT DOCUMENTS

| 1,467,358 | 9/1923 | Dizon | 350/638 |
| 2,175,896 | 10/1939 | Jiranek | 351/50 |
| 3,988,058 | 10/1976 | Chaney et al. | 351/50 |

FOREIGN PATENT DOCUMENTS 935711 2/1948 France .................. 351/50

Primary Examiner—John K. Corbin
Assistant Examiner—Loha Ben
Attorney, Agent, or Firm—Bruce & McCoy

[57] ABSTRACT

An optical device for mounting either a mirror or magnifying lens at a predetermined position in front of a wearer's eye which permits the mirror or lens to be adjusted to variable operative positions, the device includes alternative connectors for permitting it to be mounted on the wearer's eyeglass frame or on the rim of a safety helmet.

7 Claims, 9 Drawing Figures

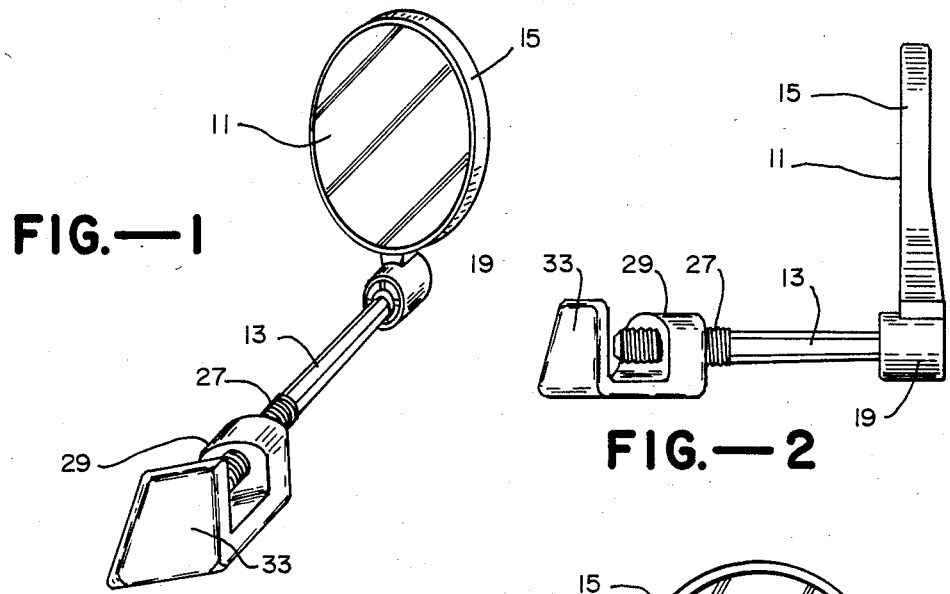
FIG.—1
FIG.—2
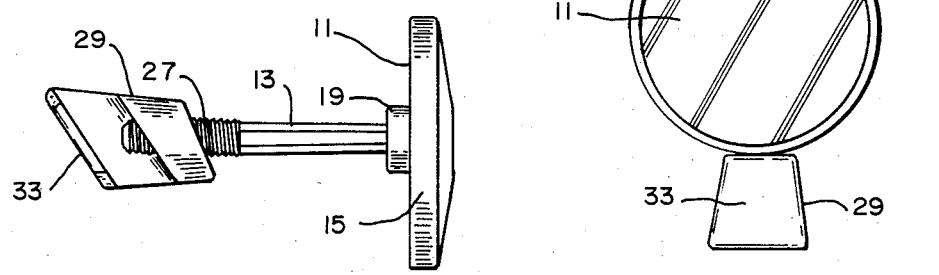
FIG.—3
FIG.—4
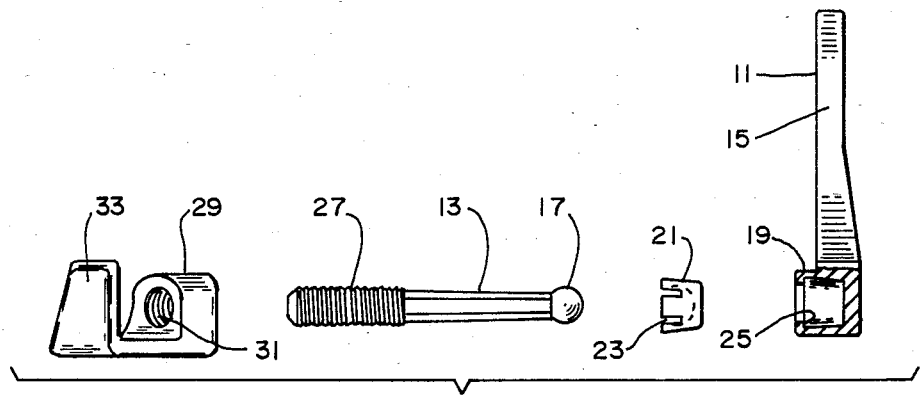
FIG.—5

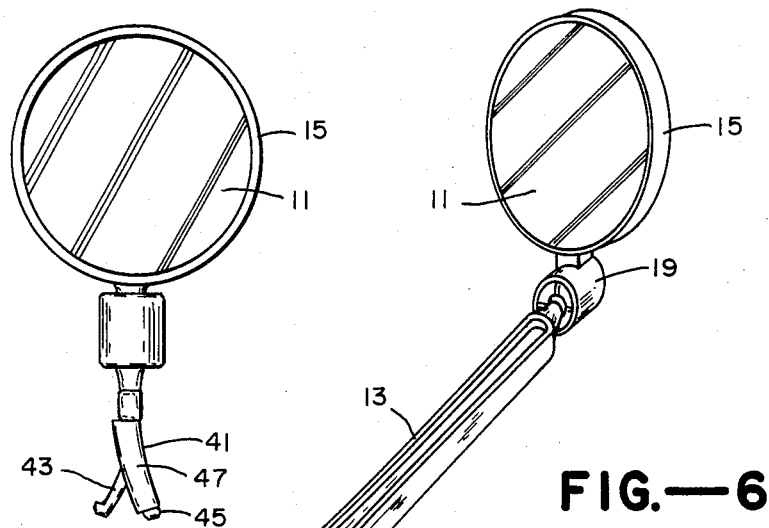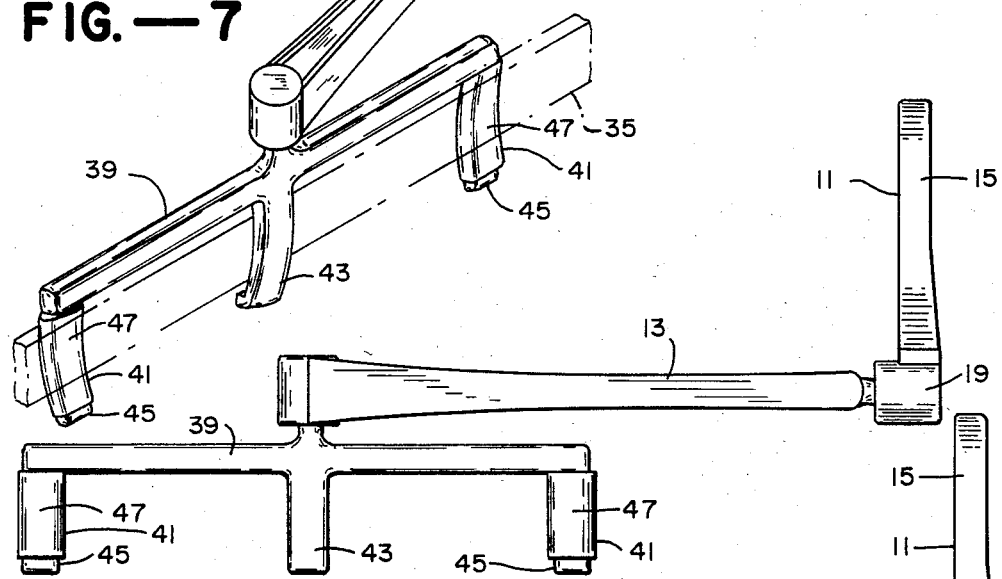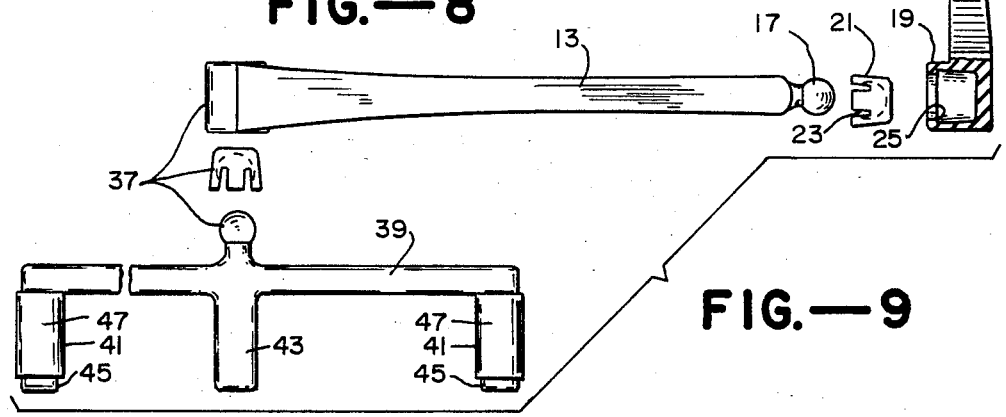

4,603,944

OPTICAL DEVICE FOR AN INDIVIDUAL

FIELD OF THE INVENTION

The present invention relates to optical devices and more particularly to either a rear view mirror or a magnifying glass which can be mounted on the head gear or frame of the eyeglasses of a wearer whereby the optical glass can be adjusted to variable operative positions in front of the eye of the wearer.

DESCRIPTION OF THE PRIOR ART

For many years, jewelers and doctors, among others, have attached magnifying lenses to their eyeglasses. In some instances these devices position the magnifying glass at variable positions with respect to the eye in front of the eyeglasses depending upon what type of work is being undertaken by the wearer of the device. While several different types of these magnifying glasses have been utilized, they are usually prototype designs which have not been represented in the published prior art.

More recently, with the popularization of bicycle riding as a form of exercise, individuals have attempted to develop rear view mirrors other than those rear view mirrors which are mounted on the bicycle handle bars. Small lightweight designs which can be attached to a protective helmet or to an eyeglasses frame are desirable for the purpose of permitting riders to see traffic approaching from the rear without having to take their eyes off the road ahead of them. The reason for this desire to see to the rear without turning the head to look is pure safety. Even momentary distraction of a bicycle rider from watching the road ahead can cause him to hit a small rock or stone or patch of gravel which will dump the bicycle and possibly cause severe injury. Likewise, looking to the rear can be very dangerous if it causes the rider to swerve, such as when a car is about to pass him. Still, it is dangerous for the bicycle rider not to be aware of traffic approaching from behind him as he often is riding further out in the traffic lane than is safe when he is being passed. When traffic approaching from behind is about to pass, he needs to squeeze against the right hand margin of the surface he is riding on to provide safe and adequate clearance between him and the overtaking vehicle. It is not known what types of devices have been utilized as rear view mirrors attached to the head of the rider and how such designs have been attached. They have usually been homemade and original designs which have not appeared in the published prior art.

However, there appears to be a need for a universal type design which can be attached to the modern safety helmets of the rider or to an eyeglass frame and which can be adjusted with respect to the eye of the wearer for whatever purpose the optical device is being utilized; either rearward viewing or magnification of an object in front of the optical device user or wearer which is inexpensive, lightweight, easy to use and readily adjustable.

SUMMARY OF THE INVENTION

The present invention is an optical device for an individual for supporting an optical glass such as a rear view mirror or magnifying glass at variable positions in front of the eye of the wearer. It includes an extension bar having a holder for an optical glass mounted on one end thereof with an optical glass mounted therein. An adjustable connection is provided between the extension bar and the optical glass. It includes a ball formed on the end of the bar and a receptacle formed on the peripheral edge of the optical glass holder.

A socket is provided which is formed to encapsulate at least a portion of the ball on the end of the extension bar. It is also formed to fit within the receptacle formed in the holder in captured relation therein. The socket includes a rounded internal configuration to mate with the ball on the extension bar. Slots extending from the open end of the socket are formed in the longitudinal sidewalls of the socket to permit the sidewalls to expand when the ball on the bar is pushed into the socket. The sides of the socket then contract around the ball when it is seated in the socket.

The external configuration of the socket is formed to mate and fit snugly within the receptacle on the optical glass holder. The receptacle includes a retaining lip formed adjacent to the internal peripheral edge of the receptacle on the holder for retaining the socket in the receptacle after it has been pushed into the receptacle beyond the retaining lip.

Means are provided for securing the opposite end of the extension bar (from the optical glass) to the head of a wearer in front of his eye. The adjustable connection permits the optical glass to be adjusted with respect to the eye of the wearer for either rear viewing or for magnifying the work in front of him.

OBJECTS OF THE INVENTION

It is therefore an important object of the present invention to provide a rear view mirror which can be attached to the helmet of a bicycle rider.

It is another object of the present invention to provide a rear view mirror which can be mounted on the earpiece of the frame of a pair of eyeglasses.

It is a further object of the present invention to provide a magnifying glass which can be attached to the earpiece of the frame of a pair of eyeglasses.

It is still another object of the present invention to provide an optical device which can be adjusted with respect to the eye of the wearer.

It is still a further object of the present invention to provide an inexpensive, lightweight, highly adjustable optical device for supporting either a rear view mirror or a magnifying glass.

Other objects and advantages of the present invention will become apparent when the preferred embodiments thereof as described in this specification are considered in conjunction with the accompanying drawings.

DESCRIPTION OF THE DRAWINGS

FIG. 1 is a perspective view of a first preferred embodiment of the optical device of the present invention;

FIG. 2 is a side elevation view of the first preferred embodiment of the present invention;

FIG. 3 is a top plan view of the first preferred embodiment of the present invention;

FIG. 4 is an end view of the first preferred embodiment of the present invention;

FIG. 5 is an exploded view in side elevation and partial cross-section of the first preferred embodiment of the present invention;

FIG. 6 is a perspective view of a second preferred embodiment of the optical device of the present invention mounted on an earpiece of an eyeglasses frame;

FIG. 7 is an end view of the second preferred embodiment of the present invention;

FIG. 8 is a side elevational view of the second preferred embodiment of the present invention; and FIG. 9 is an exploded view in side elevation and partial cross-section of the second preferred embodiment of the present invention.

DESCRIPTION OF THE PREFERRED EMBODIMENT

The present invention is an optical device for an individual which permits the adjustable placement of an optical glass 11 in front of the eye of the wearer. This can either be a mirror for rear view surveillance or a magnifying glass for inspection of items disposed in front of the wearer.

Reference is made to FIGS. 1-9. The optical device includes an extension bar 13 having a holder 15 for an optical glass mounted at one end thereof. An optical glass is mounted therein being in most instances either a mirror or a magnifying lens.

An adjustable connection is disposed between the extension bar and the optical glass. It includes a ball 17 formed on the end of the extension bar which acts as a swivel post or surface about which the optical glass can be rotated to variable positions with respect to the extension bar.

The holder 15 for the optical glass includes a receptacle 19 formed at the peripheral edge thereof. The ball formed on the extension bar fits into the receptacle and is locked therein with a compression fitting called a socket 21. The material of the optical device is a slightly deformable lightweight material with considerable strength such as nylon or another similar plastic.

The socket 21 which is provided is formed to encapsulate at least a portion of the ball surface 17 which is formed on the extension bar. The socket is also formed to fit within the receptacle 19 formed in the optical glass holder in captured relation therein. For this purpose the socket includes a spherical internal configuration to mate with the ball on the bar. The external configuration of the socket is generally of a slightly tapered cylinder. Slots 23 are formed in the longitudinal sides of the socket extending from the open end of the socket partially along the longitudinal length of the walls of the socket. These slots permit the sides of the socket to expand when the ball on the extension bar is pushed into the open end of the socket. This occurs because the open end of the socket is provided with a slightly smaller diameter than the internal configuration thereof which receives the ball, and has a slightly smaller diameter than the ball but larger than the diameter of the end of the extension bar, for capturing the ball in the cavity formed in the socket.

When the ball end of the extension bar is forced into the socket and seated therein, the expandable sides of the socket contact around the ball when it is seated in the socket thereby capturing the ball internally in the socket but with a swivel connection which permits the socket to partially rotate around the ball freely. The socket acts as a bearing for the ball.

The external configuration of the socket is formed to mate and fit snugly within the receptacle 19 on the optical glass holder which has a likewise mating female configuration. The slightly tapered cylindrical external surface of the socket is squeezed when the socket is fitted into the receptacle on the holder to capture the ball on the extension bar. The receptacle is recessed to form a retaining lip 25 adjacent to the internal peripheral edge of the receptacle 19 on the holder. This lip retains the socket in the receptacle after the socket has been pushed into the receptacle beyond the retaining lip.

Referring to FIGS. 1-5: a means is provided for securing the optical device to the head of an individual. In the preferred embodiment, the end of the extension bar opposite from said optical glass is provided with a clip or clamp. These can include a clip which can be sewn into the liner of a cap or a sun visor or a sweatband; it can include Velcro attachments which could be used to mount the optical device on a wearer's headgear or hat. However, the two most common mounting places for such as optical device would be on a rigid helmet or on the frame of eyeglasses and these have been specifically considered with respect to the present invention and unique special solutions have been provided for accommodating these two mounting platforms.

The present invention has particular use in connection with its rear view capabilities for bicycle riders. In that regard, those bicycle riders most in need of a rear view mirror are those competitive, serious riders who move at high rates of speed on streets rather than slower moving riders who pedal on the sidewalks or in parks. Likewise, those persons who ride at the higher speeds are also concerned with safety and usually wear a protective helmet which has a rim to which the present invention can be adapted provided there is an appropriate means of securing the optical device to the helmet. This clamping means is disclosed in FIGS. 1-5.

With respect to the eyeglasses frame mount, it can be utilized for either the rear view mirror embodiment positioned at the side of the head or for moving the optical glass into a position in front of the eye of the wearer for use as a magnifying glass. This clamping means is disclosed in FIGS. 6-9. While these two separate mounting platforms require particular and different considerations for adapting the optical device thereto, the remainder of the invention is basically the same although differing slightly in construction for strength. When the optical device of the present invention includes a rear view mirror, the means for securing it to the safety helmet of the bicycle rider includes a threaded shank 27 formed on the opposite end of the extension bar from the optical glass holder. A clamp 29 is screwed on to the threaded shank 27 of the extension bar for engaging the edge of the helmet above and alongside the wearer's eye.

The clamp 29 which engages the helmet includes a female threaded portion 31 to receive the threaded end of the extension bar. An angled wall 33 is disposed in spaced relation to the threaded portion 31 of the clamp at an angle of approximately 45° with respect to the axis of the extension bar 13. This axis is aligned to extend generally through the center of the angled wall. In this arrangement, as the clamp is screwed on to the extension bar with the mounting surface to which the optical device is to be secured disposed between the angled wall 33 and the threaded end 27 of the extension bar, the mounting surface will be clamped between the projecting threaded end of the extension bar and the angled wall.

Reference is made to FIGS. 6-9. In a second preferred embodiment of the invention designed for mounting the optical device on the earpiece 35 of the frame of a pair of eyeglasses, the extension bar 13 includes a second adjustable connection 37 similar to the one interconnecting the optical glass holder to the extension bar. This second adjustable connection 37 is disposed on the opposite end of the extension bar from the optical glass holder 15. This arrangement permits the optical glass to be articulated more flexibly in relation to the eye of the wearer. The axis of the swivel post of this second adjustable connection is disposed at right angles to the axis of the extension bar or the swivel post of the other adjustable connection.

In this second preferred embodiment, a means is provided for securing the opposite end of the extension bar (from the optical glass) to the head of a wearer. It includes a unique clamp for securing the optical device to the frame of a pair of eyeglasses and forms a portion of the second adjustable connection 37. It is provided with a horizontal elongated member 39 which is disposed along one of the earpieces 35 of the wearer's eyeglasses frame when the optical device is in operative position on the wearer's head.

The horizontal elongated member 39 has a multiplicity of clamp members extending therefrom. At least two of the clamp members 41 are formed to grip the same side of the eyeglasses earpiece and at least another of the clamp members 43 is disposed between the first two clamp members on said horizontal elongated frame 39 and is formed to grip the opposite side of the eyeglasses earpiece from that which the first two clamp members 41 grip. The resulting clamping action secures the optical device to the earpiece 35.

More particularly, in the second preferred embodiment, the first two clamp members 4 which extend from the horizontal elongated member 39 are disposed at opposite ends thereof and a third clamp member 43 is disposed proximate the middle thereof. The two clamp members 41 which extend from the ends of the horizontal elongated member and the center clamp member 43 are disposed at angles from the elongated member which overlap and penetrate from opposite sides the plane which is optimally disposed between the clamp members and contains the horizontal elongated member.

In order to place the clamp onto the eyeglasses earpiece 35, the earpiece is placed between one of the end clamp members and the intermediate one. Then the other end clamp member is bent outward to fit over and clamp onto and grip the earpiece. As a result, the clamp members grip the earpiece of the eyeglasses because the end ones are disposed on opposite sides of the earpiece from the center clamp member and all tend to move into the plane of the earpiece and the elongated horizontal member.

The clamp members also include means disposed on the internal faces thereof, which contact the earpiece 35 of the eyeglasses, to increase the security of the interconnection between the clamping members and the earpiece when they are in operative position. It has been found that simply providing the clamp members with a hook 45 at their lower ends and covering at least the two end clamp members with rubber sleeves 47 serves the purpose adequately. Any other friction increasing surface disposed on the internal faces of the clamps would probably work equally well.

The extension bar 13 as utilized with the second preferred embodiment (shown in FIGS. 6-9) has an I-beam cross section for strength which in this particular application is turned on its side forming in fact an H-beam cross section.

The clamp of the second preferred embodiment is formed from a strong but flexible piece of plastic which causes the tension connection of the clamp on the eyeglass frame.

The unique clamp provided for the second preferred embodiment of the invention for clamping on to an eyeglasses earpiece is uniquely designed to accommodate to numerous types and designs of earpieces and yet maintain the rear view lens in operative position. It can be mounted on top of the earpiece or below it depending on which provides the best location for the rear view mirror. The device can be utilized on either eye or a pair of magnifying glass equipped devices can be utilized for binocular magnification.

The swivel connection 37 at the in board end of the extension bar where the center clamp 43 is disposed permits the optical glass to be moved outward or inward from the wearer's head depending upon the users preference. Generally it has been found that mounting the frame under the earpiece 35 permits the optical glass to be moved directly in front of the wearer's eye whereby mounting it above the earpiece permits it to be more easily moved outboard for rear viewing.

Thus, it will be seen from the description of the preferred embodiment of the present invention that all of the objects and advantages attributable thereto have been attained. While the invention has been described in considerable detail, the invention is not to be limited to such details as have been set forth except as may be necessitated by the appended claims.

We claim:

1. An optical device for an individual comprising
   an extension bar having a holder for an optical glass mounted at one end thereof with an optical glass mounted therein,
   an adjustable connection between said extension bar and said optical glass holder including a ball formed on the end of said bar, a receptacle formed on the peripheral edge of said holder, and a socket formed to encapsulate at least a portion of the ball formed on said bar and to fit within the receptacle formed in said holder in captured relation thereof, said socket including a rounded internal configuration to mate with the ball on said bar and slots formed in the longitudinal sides of said socket extending from the open end thereof to permit the sides of said socket to expand when the ball on said bar is pushed into said socket, the external configuration of said socket being formed to mate and fit snugly within the receptacle on said holder, said receptacle including a retaining lip formed adjacent to the internal peripheral edge thereof for retaining said socket in said receptacle after said socket has been pushed into said receptacle beyond said retaining lip,
   a second adjustable connection on said extension bar similar to the one interconnecting said optical glass holder to said extension bar, said second adjustable connection disposed at the opposite end of the extension bar from said ball, swivel post axes of the adjustable connections being disposed at right angles to each other,
   means engaged with the second adjustable connection for securing the end of said extension bar opposite from said optical glass holder to a support member worn on the head of a wearer.

2. The optical device of claim 1 wherein said means for securing the opposite end of said extension bar from the optical glass holder to a support member worn on the head of a wearer includes a clamp for securement to the frame of a wearer's eyeglasses, said clamp forming a portion of the second adjustable connection.

3. The optical device of claim 2 wherein the clamp for securing the optical device to the frame of a wearer's eyeglasses includes a horizontal elongated member which is disposed along one of the earpieces of the wearer's eyeglasses frame, said horizontal elongated member having a multiplicity of clamp members extending therefrom, at least two of said members being formed to grip the same side of the earpiece and at least another of said clamp members being disposed between said first two clamp members on said horizontal elongated frmae and formed to grip the opposite side of said earpiece from said first two clamp members.

4. The optical device of claim 3 wherein said first two clamp members extending from said horizontal elongated member are disposed at opposite ends thereof and a third clamp member is disposed proximate the middle thereof, said end clamp members and said center clamp member extending from said horizontal elongated member at angles which overlap and penetrate opposite sides of the plane which is disposed between the clamp members and contains the horizontal elongated member whereby said clamp members grip the earpiece of the eyeglasses frame when they are spread apart and disposed on opposite sides thereof, said clamp members also including means disposed on the internal faces thereof which grip the earpiece of the eyeglasses frame to increase the security of the interconnection between the clamping members and said earpiece.

5. The optical device of claim 4 wherein said extension bar is formed with an H-beam cross section for strength.

6. An optical device for an individual comprising
an extension bar having a holder for an optical glass mounted at one end thereof with an optical glass mounted therein,
an adjustable connection between said extension bar and said optical glass holder including a ball formed on the end of said bar, a receptacle formed on the peripheral edge of said holder, and a socket formed to encapsulate at least a portion of the ball formed on said bar and to fit within the receptacle formed in said holder in captured relation there, said socket including a rounded internal configuration to mate with the ball on said bar and slots formed in the longitudinal sides of said socket extending from the open end thereof to permit the sides of said socket to expand when the ball on said bar is pushed into said socket, the external configuration of said socket being formed to mate and fit snugly within the receptacle on said holder, said receptacle including a retaining lip formed adjacent to the internal peripheral edge thereof for retaining said socket in said receptacle after said socket has been pushed into said receptacle beyond said retaining lip,
means for securing the end of said extension bar opposite from said optical glass holder to a support member worn on the head of a wearer, including
a threaded shank formed on the end of the extension bar, and a clamp which is secured on the threaded end of said extension bar, said clamp including a female threaded portion to receive the threaded end of said extension bar and a wall disposed in spaced relation to said threaded portion of said clamp at an angle with respect to the axis of said extension bar with the axis of said threaded shank extending generally through the center of said angled wall whereby said clamp is screwed onto said extensin bar with the surface to which the optical device is to be mounted disposed and clamped between said angled wall and the threaded end of said extension bar.

7. An optical device for an individual comprising
an extension bar having an H-beam cross section and a holder for an optical glass mounted at one end thereof with an optical glass mounted therein, said optical glass being either a reflecting mirror or a magnifying lens,
an adjustable connection between said extension bar and said optical glass holder including a ball formed on the end of said bar, a receptacle formed on the peripheral edge of said holder, and a socket formed to encapsulate at least a portion of the ball formed on said bar and to fit within the receptacle formed in said holder in captured relation therein, said socket including a rounded internal configuration to mate with the ball on said bar and slots formed in the longitudinal sides of said socket extending from the open end thereof to permit the sides of said socket to expand when the ball on said bar is pushed into said socket, the external configuration of said socket being formed to mate and fit snugly within the receptacle on said holder, said receptacle including a retaining lip formed adjacent to the internal peripheral edge thereof for retaining said socket in said receptacle after said socket has been pushed into said receptacle beyond said retaining lip,
a second adjustable connection similar to the one interconnecting said optical glass holder to said extension bar, said second adjustable connection disposed at the opposite end of the extension bar from said ball, swivel post axes of the adjustable connections being disposed at right angles to each other,
means for securing the end of said extension bar having said second adjustable connection to a support member worn on the head of a wearer, including a clamp for securing the optical device to the frame of a wearer's eyeglasses, said clamp forming a portion of the adjustable connection and having a horizontal elongated member which is disposed along one of the earpieces of the wearer's eyeglasses frame, said horizontal elongated member having a multiplicity of clamp members extending therefrom, two of said clamp members extending from said horizontal elongated member being disposed at opposite ends thereof and a third clamp member being disposed proximate the middle thereof, said clamp members extending from said horizontal elongated member at angles which overlap and penetrate opposites sides of the plane which is disposed between the clamp members and contains the horizontal elongated member whereby said clamp members grip the earpiece of the eyeglasses frame when they are spread out and the two end clamp members are disposed on the opposite side of the earpiece from said center clamp member, said clamp members also including friction increasing means on at least the internal faces of the two end clamp members which contact the earpiece of the eyeglasses frame to increase the security of the interconnection between the clamping members and said earpiece, and inwardly facing hooks at the lower ends of said clamp members to hook under the earpiece when said clamps are engaged with said earpiece.

* * * * *

UNITED STATES PATENT AND TRADEMARK OFFICE
CERTIFICATE OF CORRECTION

PATENT NO. : 4,603,944

DATED : August 5, 1986

INVENTOR(S) : John W. Greenlaw; Gary R. Schlueter; and Karsten Kettlitz

It is certified that error appears in the above—identified patent and that said Letters Patent is hereby corrected as shown below:

First page, "Assignees" is incorrect:
    Should read: Assignee: John W. Greenlaw Signed and Sealed this Nineteenth Day of July, 1988

*Attest:*

DONALD J. QUIGG

*Attesting Officer*     *Commissioner of Patents and Trademarks*